Nov. 16, 1971 D. J. KHOI 3,620,085
APPARATUS FOR MEASURING THE LEVEL OF LIQUID IN A RESERVOIR
Filed Oct. 15, 1969 2 Sheets-Sheet 2

INVENTOR:
DANNY JAMES KHOI
BY
Breitenfeld & Levine
ATTORNEYS

United States Patent Office 3,620,085
Patented Nov. 16, 1971

3,620,085
APPARATUS FOR MEASURING THE LEVEL OF
LIQUID IN A RESERVOIR
Danny James Khoi, Courbevoie, France, assignor to
Cermat, Courbevoie, France
Filed Oct. 15, 1969, Ser. No. 866,700
Claims priority, application France, Mar. 27, 1969,
6909078
Int. Cl. G01f 23/16; G01n 9/28
U.S. Cl. 73—439                                    12 Claims

ABSTRACT OF THE DISCLOSURE

At least two manometer tubes, each tube being connected between two probes located at different levels in a reservoir. The probes may be insufflation tubes connected to a gas supply. A scale movable in relation to the manometer tubes carries at least two series of curves, each associated with one of the tubes. Each curve in each series represents the height of liquid in its associated manometer tube for a given level of liquid in the reservoir for a different liquid density. A regulator is interposed between each insufflation tube and its manometer tube for maintaining the flow of gas constant through the insufflation tubes.

---

This invention relates to apparatus for measuring the level and possibly also the density of liquid in a reservoir; such apparatus is useful for use with large capacity tanks, for example, the tanks of oil tankers.

According to the present invention the apparatus includes at least two manometer tubes arranged to detect the pressure difference between at least two different pairs of levels in the reservoir, a scale movable in relation to the tubes and carrying at least two series of curves, each associated with a manometer tube, each curve in a series representing the height of liquid in the manometer tube for a given level of liquid in the reservoir for a different liquid density.

With the present apparatus it is possible to obtain with a high degree of accuracy the level of the liquid which is carried in the reservoir. This apparatus is a considerable advance over previously proposed systems in which a knowledge of the density of the liquid was necessary in order to calculate the level of the liquid in the reservoir. The apparatus can simultaneously give a measure of the density.

The probes may be insufflation tubes which are arranged to be connected to a common gas supply and the connection between each manometer tube and its insufflation tubes may conveniently contain a microregulator which is arranged to maintain the flow of gas to the insufflation tubes constant whatever the level of the liquid in the reservoir. The connection may also contain a safety valve which is arranged to close automatically if the flow of gas fails in order to prevent the liquid vapour from the liquid in the reservoir passing back through the connection to the operating room. This safety feature is particularly important when the apparatus is used in connection with liquids which have harmful vapours.

One manometer tube may have its insufflation tubes near the top of the reservoir in order to measure the pressure difference when the tank is being filled and another of the manometer tubes may have its insufflation tubes near the bottom of the reservoir in order to measure the pressure difference when the tank is nearly empty.

The invention may be carried into practice in various ways and one embodiment will now be described by way of example with reference to the accompanying drawings, of which:

FIG. 1 shows a telemetering apparatus in conjunction with the tanks $C_1$, $C_2$ and $C_3$ of a tanker N. The measuring system for the tank $C_1$ only has been show in detail.

Situated in the tank $C_1$ are four insufflation tubes $a$, $b$, $c$, $d$, which discharge compressed gas into the tank at various levels from the top to the bottom.

The four insufflation tubes are supplied with gas from a pressurized source S through a common safety valve 10 and built-in flow chamber micro-regulators $m_a$, $m_b$, $m_c$, $m_d$. The purpose of the micro-regulators is to maintain the rate of insufflation constant whatever the pressure of the gas in the source S and the level of liquid in the tank $C_1$.

Each micro-regulator incorporates a pressure-sensing chamber which is merely a tank connected in series with the gas line and which is sufficiently large for the pressure in the chamber to be constant and to be independent of the disturbances in the tank due to the introduction of the gas through the tubes $a$, $b$, $c$ and $d$.

Three manometer tubes $t_1$, $t_2$ and $t_3$ are situated in the control room of the ship opposite three series $E_1$, $E_2$ and $E_3$ of curves which are etched on a movable scale A which will be described in detail hereinafter. The tube $t_1$ is connected between the pressure-sensing chambers of the micro-regulators $m_c$ and $m_d$ by two lines $l_c$ and $l_d$. The $t_2$ is connected between the pressure-sensing chambers of the micro-regulators $m_a$ and $m_d$ by two lines $l_a$ and $l_d$. The tube $t_3$ is connected between the pressure-sensing chambers of the micro-regulators $m_b$ and $m_a$ by two lines $l_a$ and $l_b$. Each of the lines $l_a$, $l_b$, $l_c$ and $l_d$ contains a safety valve $c_a$, $c_b$, $c_c$ and $c_d$ respectively which automatically close if the gas supply fails in order to prevent vapours from the tanks reaching the control room.

A hydrometer D is connected across the lines $l_a$ and $l_b$ and its operation is controlled by a pressure-responsive switch M which is connected across the lines $l_d$ and $l_b$.

The manometer tube $t_2$ gives a measurement of the pressure difference between the bottom and the top of the tank $C_1$; this is an overall coarse measurement of the liquid level in the tank. The tube $t_1$ measures the pressure difference between a point a short distance below the maximum liquid level of the tank and the top of the tank; this gives a fine measurement of the liquid if it is near the top of the tank. The tube $t_3$ detects the pressure difference between the bottom of the tank and a point situated a little above the bottom; this gives a fine measurement of the liquid level when draining is almost complete.

Figure 1:
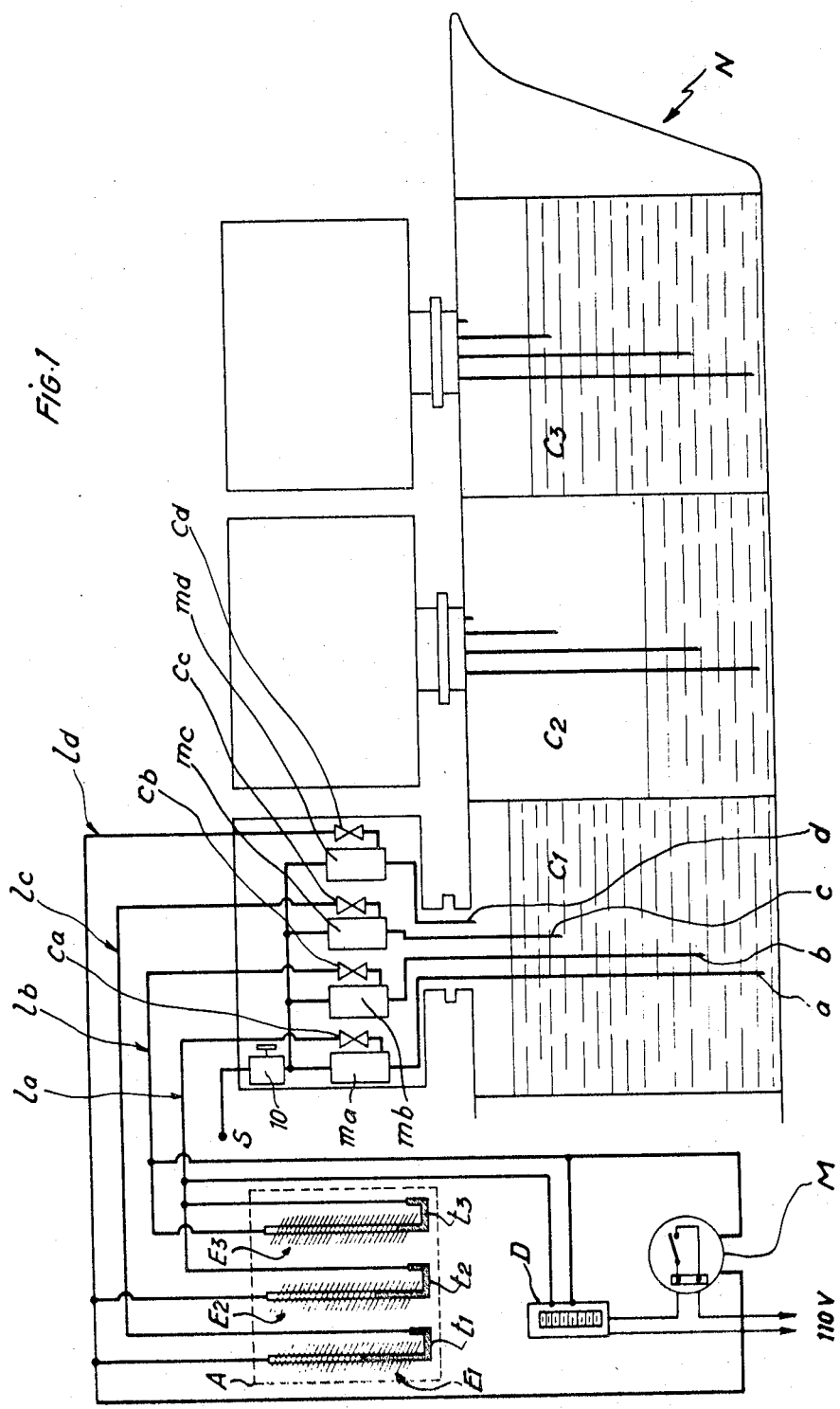
FIG. 1 is a diagrammatic representation of a telemetering apparatus installed in a tanker.
Figure 2:
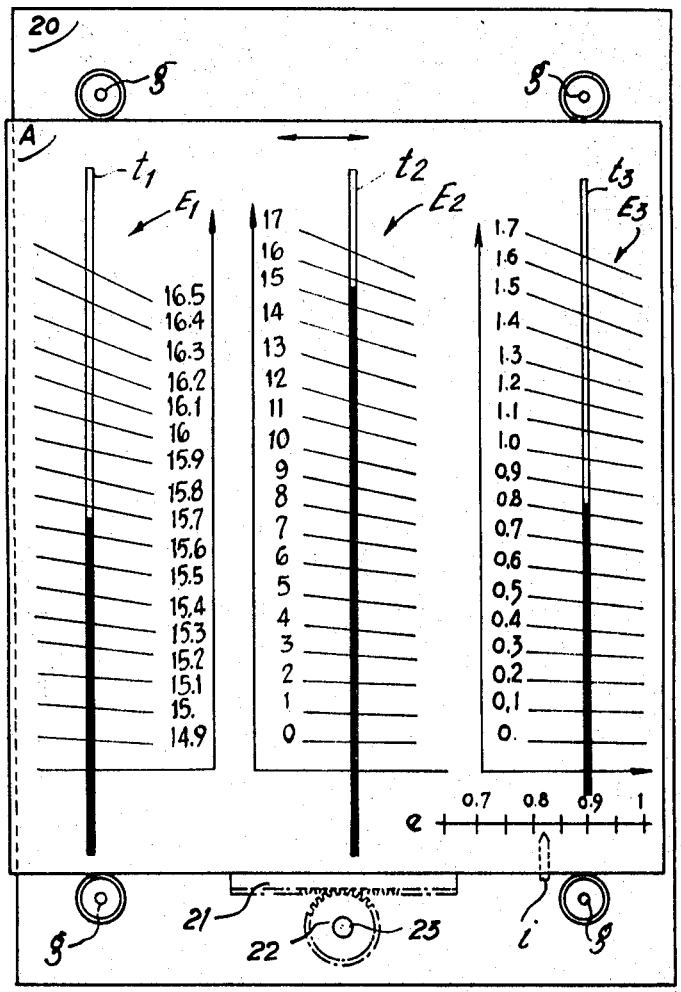
FIG. 2 shows in a diagrammatic front elevation the movable scale.

As can be seen from FIG. 2, the scale A includes three series of graduated curves $E_1$, $E_2$, $E_3$. In the example illustrated, the tank is one which has a maximum liquid level of 16 metres from the bottom. The curves $E_1$ range from 14.9 to 16.5 m., the curves $E_2$ from 0 to 17 m., and curves $E_3$ from 0 to 1.7 m.

The translucent scale A is arranged to be moved horizontally over the front of the manometer tubes $t_1$, $t_2$ and $t_3$ by means of rollers g. The scale A carries a rack 21 which is arranged to co-operate with a pinion 22 rotatably mounted on the backing 20 which carries the tubes $t_1$, $t_2$ and $t_3$, and the rollers g. The pinion can be controlled by a knurled knob 23. By means of this knob 23 it is possible to control the relative horizontal displacement of the scale A and the backing 20.

The scale A also carries a relative density scale $e$ and the backing carries a pointer $i$ so that any position of the scale A in relation to the backing 20 corresponds to a certain relative density as shown on scale $e$.

The apparatus is used as follows: when the tank $C_1$ has been filled to a level which is near the maximum level, the manometer tubes $t_1$ and $t_2$ indicate two values for the liquid level on the curves $E_1$ and $E_2$. The scale A is then moved relative to the backing 20 until these values are equal (in the example shown, 15.65 m.) With the scale in this position the pointer $i$ indicates a certain value for the density on the scale $e$ (in this case 0.81). Thus it is possible to obtain an indication of the level of liquid in the tank and the density of the liquid at the same time.

Similarly the manometers $t_2$ and $t_3$ are used when the level is near the bottom of the tank. The provision of the hydrometer D is just a safety measure.

Measurement of the level and density by the above-described method of coincidence of readings on two manometer tubes has in practice proved to be extremely accurate. The readings are not upset by the presence of the flow regulators, static pressure-sensing chambers, and safety valves, and variations in the pressure of the supply S.

What we claim is:

1. Apparatus for measuring the level of liquid in a reservoir including at least two manometer tubes arranged to detect the pressure difference between at least two different pairs of levels in the reservoir, a scale movable in relation to the tubes and carrying at least two series of curves, each associated with a manometer tube, each curve in a series representing a range of heights of liquid in the manometer tube for a given level of liquid in the reservoir and for a range of densities of liquid in the reservoir.

2. Apparatus as claimed in claim 1 in which each tube is connected between two probes at different levels in the reservoir.

3. Apparatus as claimed in claim 2 in which the probes are insufflation tubes arranged to be connected to a gas supply.

4. Apparatus as claimed in claim 3 in which each manometer tube is connected to two insufflation tubes.

5. Apparatus as claimed in claim 2 in which one of the manometer tubes has one of its probes situated at the top of the reservoir and the other situated a small distance below the first insufflation tube.

6. Apparatus as claimed in claim 2 in which one manometer tube has one probe situated at the bottom of the reservoir and the other a small distance above the first tube.

7. Apparatus as claimed in claim 2 in which one manometer tube has one probe, situated at the top of the reservoir and the other probe situated at the bottom of the reservoir.

8. Apparatus as claimed in claim 1 in which the scale also carries density markings arranged so that when movement of the scale has equalized the readings of the level of liquid in two of the manometer tubes, the density of the liquid in the reservoir is indicated by a particular marking.

9. Apparatus as claimed in claim 3 in which the connection between each manometer tube and its insufflation tube or tubes contains a micro-regulator for maintaining the flow of gas through the insufflation tube constant whatever the level of the liquid in the reservoir.

10. Apparatus as claimed in claim 9 in which the connection also contains a safety valve which is arranged to close if the flow of gas fails.

11. Apparatus as claimed in claim 1 in combination with a reservoir, and including means within said reservoir for transmitting pressures representative of said two different pairs of levels in the reservoir to said manometer tubes.

12. Apparatus as claimed in claim 11 wherein said reservoir is within a tanker.

References Cited

UNITED STATES PATENTS 3,373,609   3/1968   Sundby _____ 73—299

LOUIS R. PRINCE, Primary Examiner

D. E. CORR, Assistant Examiner

U.S. Cl. X.R.

73—302